（12） United States Patent
Fan

(10) Patent No.: US 10,740,013 B2
(45) Date of Patent: Aug. 11, 2020

(54) NON-VOLATILE DATA-STORAGE DEVICE WITH SPARE BLOCK POOLS USING A BLOCK CLEARING METHOD

(71) Applicant: Silicon Motion, Inc., Jhubei, Hsinchu County (TW)

(72) Inventor: Yu-Wei Fan, Taipei (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 0 days.

(21) Appl. No.: 16/198,992

(22) Filed: Nov. 23, 2018

(65) Prior Publication Data

US 2019/0095100 A1 Mar. 28, 2019

Related U.S. Application Data

(63) Continuation of application No. 15/436,921, filed on Feb. 20, 2017, now Pat. No. 10,168,940.

(30) Foreign Application Priority Data

Mar. 31, 2016 (TW) .............................. 105110255 A

(51) Int. Cl.
*G06F 3/06* (2006.01)
(52) U.S. Cl.
CPC ............ *G06F 3/064* (2013.01); *G06F 3/0604* (2013.01); *G06F 3/0619* (2013.01); *G06F 3/0659* (2013.01); *G06F 3/0679* (2013.01)
(58) Field of Classification Search
CPC ...... G06F 3/064; G06F 3/0659; G06F 3/0604; G06F 3/0679; G06F 3/0619
See application file for complete search history.

(56) References Cited

U.S. PATENT DOCUMENTS

| 9,122,583 | B2 | 9/2015 | Tan et al. |
| 9,123,422 | B2 | 9/2015 | Yu et al. |
| 2012/0079167 | A1 | 3/2012 | Yao |
| 2012/0246391 | A1 | 9/2012 | Meir |
| 2013/0124787 | A1 | 5/2013 | Schuette |
| 2015/0169237 | A1 | 6/2015 | Ioannou |
| 2015/0186225 | A1* | 7/2015 | Lin ..................... G06F 11/1435 714/6.12 |
| 2016/0070474 | A1 | 3/2016 | Yu et al. |
| 2017/0255514 | A1 | 9/2017 | Honna |
| 2017/0262376 | A1 | 9/2017 | Hale |

FOREIGN PATENT DOCUMENTS

| TW | 201339958 A | 10/2013 |
| TW | 201403318 A | 1/2014 |

* cited by examiner

*Primary Examiner* — Jerome Leboeuf
(74) *Attorney, Agent, or Firm* — McClure, Qualey & Rodack, LLP

(57) ABSTRACT

A block clearing method for a non-volatile data-storage device operates by determining whether a number of data block programmed in a first mode is less than a threshold, selecting a spare block from a spare pool, programming a plurality of data from the selected data blocks into the selected spare block in a second mode, mapping a plurality of logical addresses of the data to a plurality of physical addresses on the selected spare block programmed in the second mode, and releasing the selected data blocks into the spare pool, wherein the selected spare block is able to be programmed in either the first mode or the second mode. Following the determining step, if the determination is true, the method selects a plurality of data blocks programmed in the first mode.

15 Claims, 6 Drawing Sheets

NON-VOLATILE DATA-STORAGE DEVICE WITH SPARE BLOCK POOLS USING A BLOCK CLEARING METHOD

CROSS REFERENCE TO RELATED APPLICATIONS

This Application is a Continuation of U.S. application Ser. No. 15/436,921, filed on Feb. 20, 2017, now U.S. Pat. No. 10,168,940, which claims priority of Taiwan Patent Application No. 105110255, filed on Mar. 31, 2016, the entirety of which is incorporated by reference herein.

BACKGROUND OF THE INVENTION

Field of the Invention

The present invention is related to a data maintenance method of a data storage device, and in particular to a data maintenance method for a Triple-Level Cell.

Description of the Related Art

Flash memory is considered a non-volatile data-storage device, using electrical methods to erase and program itself. NAND Flash, for example, is often used in memory cards, USB flash devices, solid state devices, eMMCs, and other memory devices.

Flash memory such as NAND Flash uses a multiple-block structure to store data, wherein the flash memory uses floating gate transistors. The floating gates of the floating gate transistor may catch electronic charges for storing data. However, the electronics might undergo loss from the floating gate due to the operation of the flash memory or various environmental parameters, which can affect data retention. The writing process of the Triple-Level Cell (TLC) is more complicated than the other types of cells of the flash memory. Therefore, a stable and efficient writing process for the Triple-Level Cell is needed.

BRIEF SUMMARY OF THE INVENTION

A detailed description is given in the following embodiments with reference to the accompanying drawings.

An exemplary embodiment provides a data storage device including a flash memory and a controller. The flash memory has a plurality of SLC-spare blocks, a plurality of SLC-data blocks, a plurality of TLC-spare blocks and a plurality of TLC-data blocks. The controller writes data into the SLC-spare blocks in response to a write command arranged to write the data into the flash memory, wherein when a first predetermined condition is satisfied, the controller selects a plurality of first TLC-data blocks with the least amount of valid data from the TLC-data blocks, writes valid data stored in the first TLC-data blocks into at least one first TLC-spare block, and releases the TLC-data blocks to increase the number of TLC-spare blocks by one.

Another exemplary embodiment provides a data storage device including a flash memory and a controller. The flash memory has a plurality of logical SLC-spare blocks, a plurality of logical SLC-data blocks, a plurality of TLC-spare blocks and a plurality of TLC-data blocks. The controller writes data into one of the logical SLC-spare blocks in response to a write command from a host, wherein when a first predetermined condition is satisfied, the controller selects a part of the TLC-data blocks with the least amounts of valid data, writes valid data stored in the part of the TLC-data blocks into one of the TLC-spare block, and releases the part of the TLC-data blocks.

Another exemplary embodiment provides a data maintenance method applied to a data storage device having a flash memory, wherein the flash memory has a plurality of SLC-spare blocks, a plurality of SLC-data blocks, a plurality of TLC-spare blocks and a plurality of TLC-data blocks. The data maintenance method includes: receiving a write command arranged to write data into the flash memory; and writing the data into the SLC-spare blocks in response to a write command, wherein when a first predetermined condition is satisfied, the step of writing the data into the SLC-spare blocks further includes: selecting a plurality of first TLC-data blocks with the least amount of valid data from the TLC-data blocks; writing valid data stored in the first TLC-data blocks into at least one first TLC-spare block; and releasing the first TLC-data block to increase the number of TLC-spare blocks by one.

Another exemplary embodiment further provides a data maintenance method applied to a data storage device having a flash memory, wherein the flash memory has a plurality of logical SLC-spare blocks, a plurality of logical SLC-data blocks, a plurality of TLC-spare blocks and a plurality of TLC-data blocks. The data maintenance method further includes: writing data into one of the logical SLC-spare blocks in response to a write command from a host, wherein when a first predetermined condition is satisfied, the step of writing data into one of the logical SLC-spare blocks further includes: selecting a part of the TLC-data blocks with the least amounts of valid data; writing valid data stored in the part of the TLC-data blocks into one of the TLC-spare block; and releasing the part of the TLC-data blocks.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
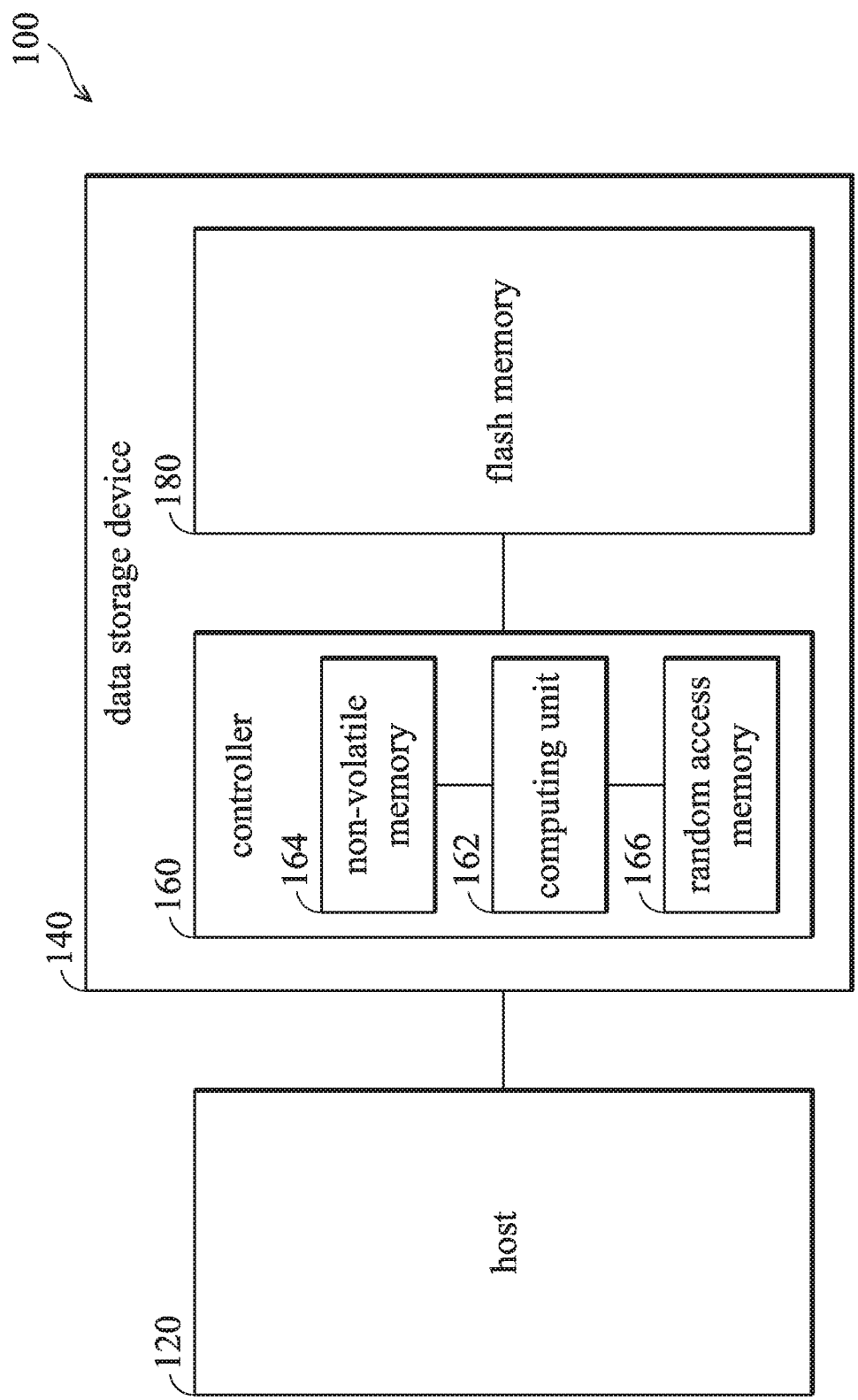
FIG. 1 is a schematic diagram illustrating an electronic system in accordance with an embodiment.

FIG. 1 is a schematic diagram illustrating an electronic system in accordance with an embodiment. The electronic system 100 includes a host 120 and a data storage device 140. The data storage device 140 includes a flash memory 180 and a controller 160, and operates in response to the commands of the host 120. The controller 160 includes a computing unit 162, a non-volatile memory 164 (ROM) and a random access memory 166 (RAM). The non-volatile memory 164, the program code stored in the non-volatile memory 164 and data stored in the non-volatile memory 164 constitute firmware executed by the computing unit 162, and the controller 160 is configured to control the flash memory 180 based on the firmware. The flash memory 180 includes a plurality of blocks, each of the blocks has a plurality of pages, wherein the minimum write unit of the flash memory 180 is a page, and the minimum erase unit of the flash memory 180 is a block. It should be noted that, in one of the embodiments, the flash memory 180 is a solid state device (SSD).

Figure 2:
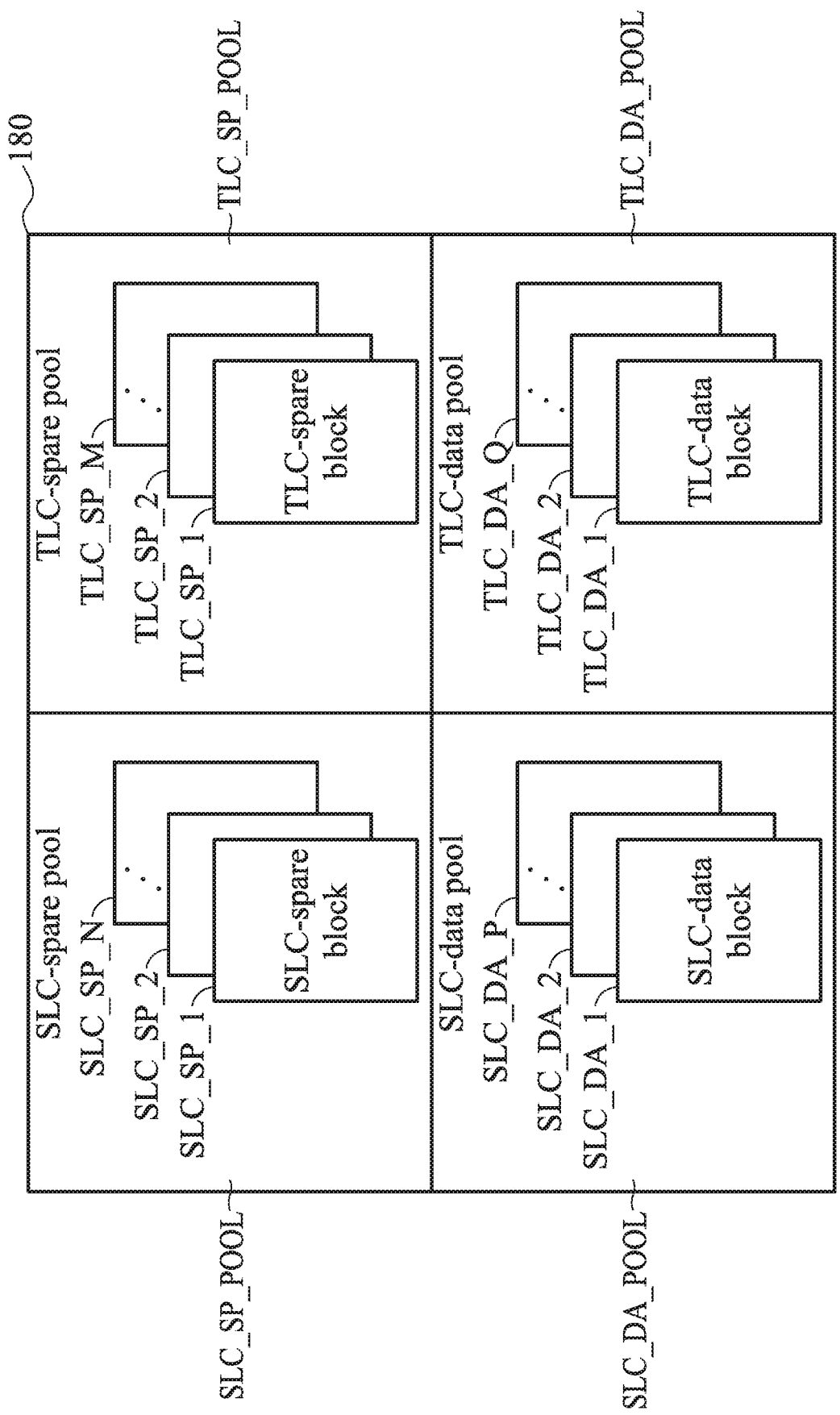
FIG. 2 is a schematic diagram illustrating a flash memory in accordance with an embodiment.

FIG. 2 is a schematic diagram illustrating a flash memory in accordance with an embodiment. As shown in FIG. 2, the flash memory 180 has an SLC-spare pool SLC_SP_POOL, a TLC-spare pool TLC_SP_POO, an SLC-data pool SLC_DA_POOL and a TLC-data pool TLC_DA_POOL. The SLC-spare pool SLC_SP_POOL includes a plurality of SLC-spare blocks SLC_SP_1~SLC_SP_N, wherein "SLC" is the abbreviation of "Single-Level Cell", the total number of SLC-spare blocks is "N", and the size of each SLC-spare block is equal to a block, but it is not limited thereto. Namely, the SLC-spare blocks SLC_SP_1~SLC_SP_N are SLC blocks that are without valid data, and the SLC-spare blocks SLC_SP_1~SLC_SP_N are the blocks of the flash memory 180 that are arranged to be written by either its default way or a the SLC storage mode (make a TLC block work as a SLC block simulative). It should be noted that, after any of the SLC-spare blocks SLC_SP_1~SLC_SP_N in the SLC-spare pool SLC_SP_POOL is written by valid data, the SLC-spare block with valid data will be defined as an SLC-data block (new SLC-data block) and pushed into the SLC-data pool SLC_DA_POOL. The SLC-data pool SLC_DA_POOL includes a plurality of SLC-data blocks SLC_DA_1~SLC_DA_P, wherein "P" is the total number of SLC-data blocks in the SLC-data pool SLC_DA_POOL, and the size of each of the SLC-data blocks is equal to a block, but it is not limited thereto. Namely, the SLC-data blocks SLC_DA_1~SLC_DA_P are the SLC blocks that have valid data, and the valid data of the SLC-data blocks SLC_DA_1~SLC_DA_P is arranged to be written into the TLC-spare blocks by TLC storage mode. It should be noted that, after the valid data stored in the SLC-data block in the SLC-data pool SLC_DA_POOL is programmed (written) into the TLC-spare block, the SLC-data block will be defined as an SLC-spare block and pushed into the SLC-spare pool SLC_SO_POOL. The TLC-spare pool TLC_SP_POOL includes a plurality of TLC-spare blocks TLC_SP_0~TLC_SP_M, wherein "TLC" is the abbreviation of "Triple-Level Cell", and "M" is the total number of TLC-spare blocks TLC_SP_0~TLC_SP_M in the TLC-spare pool TLC_SP_POOL, and the size of each TLC-spare block is equal to a block. Namely, the TLC-spare blocks TLC_SP_0~TLC_SP_M are the TLC blocks without valid data, and the TLC-spare blocks TLC_SP_0~TLC_SP_M are the blocks that have valid data written by the TLC storage mode. More specifically, the data written into the TLC-spare blocks TLC_SP_0~TLC_SP_M was stored in the SLC-data blocks. It should be noted that a TLC-spare block having valid data will be defined as a TLC-data block (a new TLC-data block) and pushed into the TLC-data pool TLC_DA_POOL. The TLC-data pool TLC_DA_POOL includes a plurality of TLC-data blocks TLC_DA_1~TLC_DA_Q, wherein "Q" is the total number of TLC-data blocks in the TLC-data pool TLC_DA_POOL, and the size of each TLC-data block is equal to a block, but it is not limited thereto. Namely, the TLC-data blocks TLC_DA_1~TLC_DA_Q are the TLC blocks that have valid data. It should be noted that, when the valid data stored in a TLC-data block in the TLC-data pool TLC_DA_POOL is invalidated, the TLC-data block will be defined as a TLC-spare block (a new TLC-spare block) and pushed into the TLC-spare pool TLC_SP_POOL.

It should be noted that, before any data is written into the flash memory 180, the TLC-data pool TLC_DA_POOL does not have any TLC-data blocks and the SLC-data pool SLC_DA_POOL does not have any SLC-data blocks.

Moreover, the memory space of each of the TLC-data blocks TLC_DA_1~TLC_DA_Q and the TLC-spare blocks TLC_SP_1~TLC_SP_M is three times the memory space of each of the SLC-data blocks SLC_DA_1~SLC_DA_P and the SLC-spare blocks SLC_SP_1~SLC_SP_N. More specifically, the TLC blocks and the SLC blocks are the blocks of the flash memory 180, the physical structure of the TLC block and the SLC block are the same. However, the controller has to program the TLC block by a specific voltage several times to write data into the TLC block, and the controller only has to program the SLC block one time to write data into the SLC block. In one embodiment, the controller has to program the TLC block by a specific voltage three times to write data into the TLC block. Namely, the data stored in three SLC-data blocks can be written into one TLC-data block.

The SLC block is more stable than a TLC block, so that, in one of the embodiments of the present invention, the function of SLC blocks is arranged to cache data. Namely, the SLC blocks serve as the cache memory for temporarily storing data before the data is written into the TLC blocks. In one embodiment, the controller 160 starts to write the data stored in the SLC blocks into the TLC blocks when the SLC blocks are almost consumed (the number of SLC-data blocks is greater than a predetermined amount). Although moving the data of the SLC-data blocks to the TLC blocks can increase the number of SLC-spare blocks, the controller 160 will not be able to finish the tasks indicated by the user or other devices and the performance (read or write) will suffer.

Therefore, in one of the embodiments, based on the features of the SLC block and TLC block, the controller 160 may alternatively execute the write operation and the clear operation of the SLC data block to ensure that the SLC-spare block of the flash memory 180 will be provided stably and the write operation indicated by the host will be finished stably.

More specifically, when the controller 160 receives a write command arranged to write data into the flash memory 180 from the host 120, the controller 160 writes the data into the SLC-spare blocks in response to the write command. Moreover, before any of the SLC-spare blocks is written, the controller 160 determines whether the number of SLC-spare blocks SLC_SP_1~SLC_SP_N is less than a second predetermined amount to determine whether a second predetermined condition is satisfied. When the number of SLC-spare block SLC_SP_1~SLC_SP_N is less than the second predetermined amount, the second predetermined condition is satisfied. When the second predetermined condition is satisfied, the controller 160 starts to clear the SLC-data blocks SLC_DA_1~SLC_DA_P. Namely, when the second predetermined condition is satisfied, the controller 160 programs three of the SLC data blocks SLC_DA_1~SLC_DA_P that have valid data for the longest time into one of the TLC spare blocks TLC_SP_1~TLC_SP_M for every three of the SLC spare blocks that are written. It should be noted that, in one embodiment, the data storage device 140 has a block maintenance table arranged to record how long the valid data has existed in each of the SLC-data blocks SLC_DA_1~SLC_DA_P in the SLC-data pool SLC_DA_POOL, but it is not limited thereto. In other embodiments, the data storage device 140 may use other methods to record how long the valid data has existed in each of the SLC-data blocks SLC_DA_1~SLC_DA_P in the SLC-data pool SLC_DA_POOL. Moreover, when the second predetermined condition is not satisfied, the controller 160 writes the data into the SLC-spare blocks without clearing the SLC-data blocks, and determines whether the second predetermined condition is satisfied before any of the SLC-spare blocks is written. In another embodiment, the second predetermined condition may include any situation that needs to clear the SLC-data blocks.

In one embodiment, the controller 160 maps at least one logical address of the written data to the written SLC-spare blocks and defines the written SLC-spare blocks as the new SLC-spare blocks after programming the data of the SLC-data block for the longest valid data into one of the TLC-spare blocks TLC_SP_1~TLC_SP_M. When a power-off event or another interruption occurs during the process of programming data into the TLC-spare block, the original data is still in the original SLC-data block. Therefore, the data can also be kept in the SLC block, which is more stable than a TLC block.

For example, when the second predetermined condition is satisfied, the controller 160 writes a first part of the data into three first SLC spare blocks of the SLC spare blocks. Next, before other parts of the data are written into the other SLC-spare blocks, the controller 160 selects three first SLC-data blocks, which have had valid data for the longest time (the oldest valid data), from the SLC-data blocks SLC_DA_1~SLC_DA_P and programs the data stored in the first SLC-data blocks into one of the TLC-spare blocks to release the first SLC-data blocks, wherein the data link between the released first SLC-data blocks and the original data is lost, and the released first SLC-data blocks are transformed into SLC-spare blocks. Next, after the first SLC-data blocks are released, the controller 160 maps at least one logical address of the first part of the data to the first SLC-spare blocks, and defines the first SLC-spare blocks as three new SLC-data blocks.

After defining the first SLC-spare blocks as the SLC-data blocks, the controller 160 writes a second part of the data into three second SLC-spare blocks of the SLC-spare blocks SLC_DA_1~SLC_DA_P. Before other parts of the data are written into the other SLC-spare blocks, the controller 160 selects three second SLC-data blocks, which have had valid data for the longest time, from the SLC-data blocks SLC_DA_1~SLC_DA_P and programs the data stored in the second SLC-data blocks into one of the TLC-spare blocks to release the second SLC-data blocks, wherein the data link between the released second SLC-data blocks and the original data is lost, and the released second SLC-data blocks are transformed into SLC-spare blocks by defining them as the new SLC-spare blocks. Next, after the second SLC-data blocks are released, the controller 160 maps at least one logical address of the second part of the data to the second SLC-spare blocks, and defines the second SLC-spare blocks as three new SLC-data blocks. Next the controller 160 repeats the above steps until all of the data is written into the SLC-spare blocks. Moreover, the length of the first part of the data is equal to an SLC block, and the length of the second part of the data is also equal to an SLC block.

Moreover, when the TLC blocks are almost filled with the valid data, the controller 160 starts to clear the TLC-data blocks to release the TLC-spare blocks (Garbage collection). In one embodiment, the controller 160 clears the TLC-data blocks based on a move write ratio (the clean ratio), wherein the move write ratio (the clean ratio) is designed based on the worst case. For example, if the flash memory 180 has 100 TLC blocks and the effective memory space is 99 TLC blocks, the worst case is that 99% of each of the 100 TLC blocks is filled by valid data and 1% of each of the 100 TLC blocks is invalid data. In the worst case, the flash memory 180 needs to collect invalid data from 100 TLC blocks to release one available TLC block (TLC-spare block). Namely, the controller 160 needs to execute programming on the TLC-data blocks 99 times to release the available TLC block before next SLC-spare block is filled. Therefore, based on the above worst case, the move write ratio (the clean ratio) of the flash memory 180 is 100. Namely, when the number of TLC-spare blocks is less than a first predetermined amount, the controller 160 will program the TLC-data blocks 99 times to release one TLC-spare block before the next SLC-spare block is filled. More specifically, every time one TLC-spare block needs to be released, the controller 160 has to program the TLC-data blocks 99 times. Therefore, the write performance of the controller 160 will be unstable due to the large loading of programming the TLC-data blocks in one go.

Therefore, in another embodiment, the controller 160 may dynamically determine a program ratio according to the current amount of invalid data in the TLC-data blocks TLC_DA1~TLC_DAQ, and release one TLC-spare block according to the determined program ratio before the next SLC-spare block is filled. It should be noted that, in one of the embodiments, the data storage device 140 has a maintenance table arranged to record how much the valid data is stored in each of the TLC-data blocks TLC_DA_1~TLC_DA_Q in the TLC-data pool TLC_DA_POOL, but it is not limited thereto. In other embodiments, the data storage device 140 may use other methods to record how much the valid data is stored in each of the TLC-data blocks TLC_DA_1~TLC_DA_Q in the TLC-data pool TLC_DA_POOL.

More specifically, after receiving a write command arranged to write data into the flash memory 180, the controller 160 writes the data into the SLC-spare blocks SLC_SP1~SLC_SP_N in response to the write command. More specifically, before any of the SLC-spare blocks is written, the controller 160 determines whether the number of TLC-spare blocks TLC_SP_1~TLC_SP_M is less than a first predetermined amount to determine whether a first predetermined condition is satisfied. When the number of TLC-spare blocks TLC_SP_1~TLC_SP_M is less than the first predetermined amount, the first predetermined condition is satisfied. When the first predetermined condition is satisfied, the controller 160 starts to clear the TLC-data blocks TLC_DA_1~TLC_DA_Q. Namely, when the first predetermined condition is satisfied, the controller 160 programs a plurality of first TLC-data blocks of the TLC-data blocks TLC_DA1~TLC_DA_Q to increase the number of TLC-spare blocks when (before or after) any of the SLC-spare blocks is written. It should be noted that, to increase the number of TLC-spare blocks by one, the invalid data stored in the first TLC-data blocks has to be larger than or equal to one TLC-data block (or one TLC-spare block). Namely, to increase the number of TLC-spare block by one, the controller 160 selects a plurality of TLC-data blocks with the least amount of valid data from the TLC-data blocks TLC_DA1~TLC_DA_Q to serve as the first TLC-data blocks, and writes the valid data stored in the first TLC-data blocks into at least one first TLC-spare block to release the first TLC-data blocks, wherein the total length of invalid data stored in the first TLC-data blocks is equal to or more than one TLC data block (or one TLC-spare block). Moreover, when the first predetermined condition is not satisfied, the controller 160 consecutively writes the data, which is indicated by the write command, into the SLC-spare blocks SLC_SP1~SLC_SP_N. In other embodiments, the first predetermined condition may also include any event that needs to clear the TLC-data blocks TLC_DA1~TLC_DA_Q.

Moreover, in one of the embodiments, the controller 160 maps at least one logical address of the written data to the written first SLC-spare block and defines the first SLC-spare blocks mapped to the logical address as the SLC-data block after releasing the first TLC-data blocks. When a power-off event or another interruption occurs during the process of writing data into the SLC-spare block, the logical address of the data is not mapped to the written SLC-spare block. Namely, although the data is written into the first SLC-spare block when a power-off event or another interruption occurs during the process of writing data into a first SLC-spare block, the host 120 and the controller 160 will not know that the data has been written into the flash memory 180. Therefore, after the power-off event or other interruption, the controller 160 will re-write the data into the flash memory 180 to ensure that the data is not damaged.

For example, before any of the SLC-spare blocks is written, the controller 160 determines whether the first predetermined condition is satisfied. When the first predetermined condition is satisfied, the controller 160 writes a first part of the data into a first SLC-spare block of the SLC spare blocks. Next, before other parts of the data except for the first part are written into other SLC-spare blocks, the controller 160 selects a plurality of first TLC-data blocks with the least amount of valid data from the TLC-data blocks TLC_DA1~TLC_DA_Q, wherein the total data length of the valid data stored in the first TLC-data blocks is equal to or more than one TLC block. Furthermore, the controller 160 writes the valid data of the first TLC-data blocks into at least one first TLC-spare block, and releases the first TLC-data blocks to increase the number of TLC-spare blocks by one, wherein the logical addresses of the valid data stored in the original first TLC-data blocks are mapped to the written first TLC-spare block, the first TLC-spare block mapped to the logical address is defined as a new TLC-data block, the data link between the original first TLC-data blocks and the original data is lost, and the first TLC-data block which lost the data link with the original data is defined as a new TLC-spare block. Lastly, after the first TLC-data blocks are released, the controller 160 maps the logical address of the written data to the written first SLC-spare block, and defines the first SLC-spare block as a new SLC-data block. When the first predetermined condition is not satisfied, the controller 160 directly writes the first part of the data into the first SLC-spare block, maps at least one logical address of the written data to the written first SLC-spare block, and defines the first SLC-spare block, which is mapped to the logical address, as the SLC-data block. Next, the controller 160 repeats the above steps until all of the data is written into the flash memory 180.

It should be noted that the first predetermined amount and the second predetermined amount can be determined by the developer according to the different requirements of different flash memories, wherein the first predetermined amount and the second predetermined amount are positive integers greater than zero.

For example, if the first predetermined amount is "5", and the second predetermined amount is "10," then the controller 160 writes data into the SLC-spare blocks in the SLC-spare pool SLC_SP_POOL in response to the received write command until the SLC-spare pool SLC_SP_POOL has only 9 SLC-spare blocks SLC_SP_1~SLC_SP_9 remaining. The controller 160 starts to program data of three of the SLC-data blocks into one TLC-spare block in the TLC-spare pool TLC_SP_POOL when every three of the SLC-spare blocks are written, so that the number of SLC-spare blocks in the SLC-spare pool SLC_SP_POOL remains at "9". The TLC-spare blocks which are written by valid data are sequentially pushed into the TLC-data pool TLC_SP_POOL to become TLC-data blocks until the TLC-spare pool TLC_SP_POOL has only 4 TLC-spare blocks TLC_SP_1~TLC_SP_4 remaining. After a part of the data is written into an SLC-spare block, the controller 160 gathers the valid data of the TLC-data blocks in the TLC-data pool TLC_DA_POOL to release one TLC-spare block. Next, the number of TLC-spare blocks in the TLC-spare pool TLC_SP_POOL is increased to "5". Next, the controller 160 continues to program the data stored in three of the SLC-data blocks into one TLC-spare block in the TLC-spare pool TLC_SP_POOL when every three of the SLC-spare blocks are written, and so on, until all of the data indicated by the write command is written into the flash memory 180.

For example, the TLC-spare pool TLC_SP_POOL has only 4 TLC-spare blocks TLC_SP_1~TLC_SP_4 remaining, the TLC-data pool TLC_DA_POOL includes 8 TLC-data blocks TLC_DA_1~TLC_DA_8 each with 1/3 invalid data, 16 TLC-data block2 TLC_DA_9~TLC_DA_24 each with 1/6 invalid data, and 10 TLC-data blocks TLC_DA_25~TLC_DA_34 each with 1/10 invalid data. In this embodiment, after a part of the data is written into one SLC-spare block, the controller 160 selects three TLC-data blocks each with 1/3 invalid data from the TLC-data pool TLC_DA_POOL, such as TLC-data blocks TLC_DA_1~TLC_DA_3. Next, the controller 160 selects two TLC-spare blocks TLC_SP_1~TLC_SP_2 to write the 6/3 valid data stored in the TLC-data blocks TLC_DA_1~TLC_DA_3 into the TLC-spare blocks TLC_SP_1~TLC_SP_2. Therefore, the TLC-spare blocks TLC_SP_1~TLC_SP_2 are pushed to the TLC-data pool TLC_DA_POOL and defined as the TLC-data blocks, and the original TLC-data blocks TLC_DA_1~TLC_DA_3 are pushed to the TLC-spare pool TLC_SP_POOL and defined as the TLC-spare blocks. The number of TLC-spare blocks in the TLC-spare pool TLC_SP_POOL is increased by three and decreased by two, such that the number of TLC-spare blocks in the TLC-spare pool TLC_SP_POOL is increased by 1.

In another example, the TLC-spare pool TLC_SP_POOL has only 4 TLC-spare blocks TLC_SP_1~TLC_SP_4 remaining, the TLC-data pool TLC_DA_POOL includes 8 TLC-data blocks TLC_DA_1~TLC_DA_8 each with 1/2 invalid data, 16 TLC-data blocks TLC_DA_9~TLC_DA_24 each with 1/3 invalid data, 10 TLC-data blocks TLC_DA_25~TLC_DA_34 each with 1/7 invalid data. In this embodiment, after a part of the data indicated by a write command is written into an SLC-spare block, the controller 160 will select two TLC-data blocks each with 1/2 invalid data from the TLC-data pool TLC_DA_POOL, such as the TLC-data blocks TLC_DA_1~TLC_DA_2. Next, the controller 160 selects a TLC-spare block TLC_SP_1 to write the 2/2 valid data stored in the TLC-data blocks TLC_DA_1~TLC_DA_2 into the TLC-spare block TLC_SP_1. Therefore, the TLC-spare block TLC_SP_1 is pushed to the TLC-data pool TLC_DA_POOL and defined as a TLC-data block, and the original TLC-data blocks TLC_DA_1~TLC_DA_2 are pushed to the TLC-spare pool TLC_SP_POOL and defined as TLC-spare blocks. The number of TLC-spare blocks in the TLC-spare pool TLC_SP_POOL is first increased by two and then decreased by one, so that the total number of TLC-spare blocks in the TLC-spare pool TLC_SP_POOL is increased by one.

It should be noted that the invalid data in the TLC-data blocks TLC_DA_Z~TLC_DA_Q is caused by a double write or delete operation of the controller 160. For example, when the controller 160 is required to write data to a specific logical address which has been written before, the controller 160 will write the data into a new block, and disconnect the data link between the specific logical address and the original written block to re-map the specific logical address to the new block. Therefore, the data stored in the original block, which was mapped to the specific address, become invalid data.

Figure 3A:
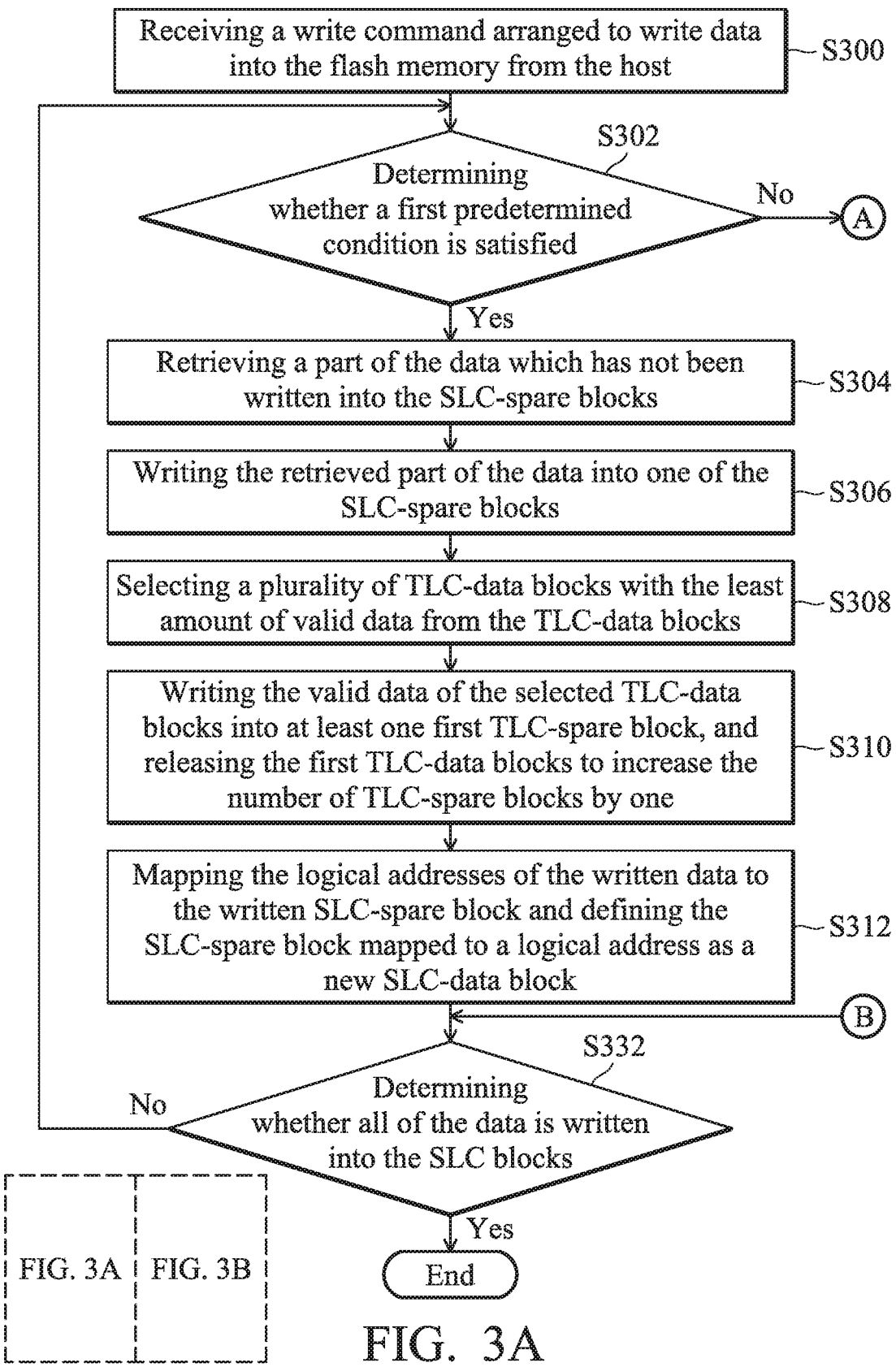
FIG. 3A-3B is a flowchart of a data maintenance method in accordance with an embodiment.
Figure 3B:
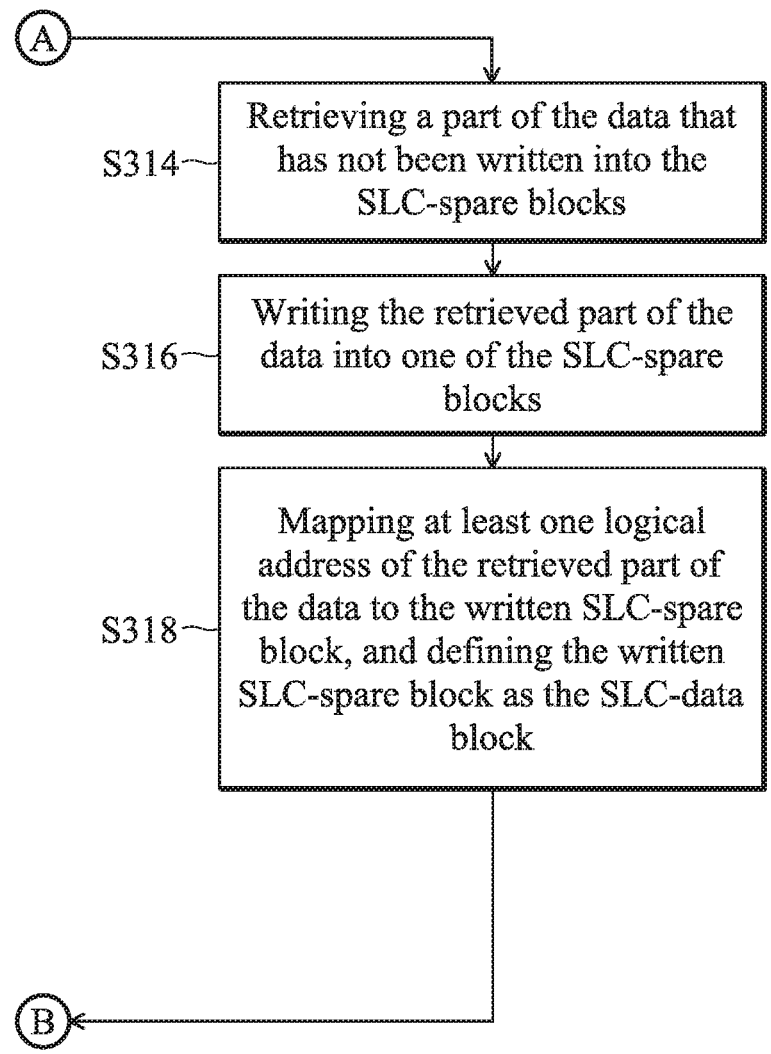

FIG. 3A-3B is a flowchart of a data maintenance method in accordance with an embodiment. The data maintenance method is applied to the data storage device 140 of FIG. 1. The process starts at step S300.

In step S300, the controller 160 receives a write command arranged to write data into the flash memory 180 from the host 120. In this embodiment, the length of the data indicated by the write command is longer than three SLC blocks, but it is not limited thereto. In this embodiment, the controller 160 may dynamically determine a program ratio according to the current amount of invalid data in the TLC-data blocks TLC_DA1~TLC_DAQ, and release one TLC-spare block according to the determined program ratio before the next SLC-spare block is filled.

Next, in step S302, the controller 160 determines whether a first predetermined condition is satisfied. In one embodiment, the controller 160 determines whether the number of TLC-spare blocks TLC_SP_1~TLC_SP_M is less than a first predetermined amount to determine whether a first predetermined condition is satisfied. When the number of TLC-spare blocks TLC_SP_1~TLC_SP_M is less than the first predetermined amount, the first predetermined condition is satisfied. More specifically, when the first predetermined condition is satisfied, the process goes to step S304 to start clearing the TLC-data blocks TLC_DA_1~TLC_DA_Q. When the first predetermined condition is not satisfied, the process goes to step S314. In other embodiments, the first predetermined condition may also include any event that needs to clear the TLC-data blocks TLC_DA1~TLC_DA_Q.

In step S304, the controller 160 retrieves a part of the data which has not been written into the SLC-spare blocks. More specifically, the controller 160 retrieves the next part of the data, which follows the previously retrieved part of the data, wherein the length of the part of the data is equal to one SLC block. When the remaining part of the data is less than the memory space of one SLC block, the controller 160 retrieves all of the remaining data.

Next, in step S306, the controller 160 writes the retrieved part of the data into one of the SLC-spare blocks SLC_SP_1~SLC_SP_N. Namely, the controller 160 writes the part of the data that is retrieved in step S304 into one of the SLC-spare blocks SLC_SP_1~SLC_SP_N.

Next, in step S308, the controller 160 selects a plurality of TLC-data blocks with the least amount of valid data from the TLC-data blocks TLC_DA1~TLC_DA_Q, wherein the total data length of the valid data stored in the selected TLC-data blocks is equal to or more than one TLC block.

Next, in step S310, the controller 160 writes the valid data of the selected TLC-data blocks into at least one first TLC-spare block, and releases the first TLC-data blocks to increase the number of TLC-spare blocks by one, wherein the logical address of the valid data stored in the selected TLC-data blocks is mapped to the written TLC-spare block, the written TLC-spare block mapped to the logical address is defined as a new TLC-data block, the data link between the selected TLC-data blocks and the original data is lost, and the selected TLC-data block which lost the data link with the original data is defined as a new TLC-spare block.

Next, in step S312, the controller 160 maps the logical addresses of the written data to the written SLC-spare block and defines the SLC-spare block mapped to a logical address as a new SLC-data block. Namely, the controller 160 maps the logical address of the part of the data, which is retrieved in step S304, to the SLC-spare block written in step S306 and defines the SLC-spare block written in step S306 as an SLC-data block.

In step S314, the controller 160 retrieves a part of the data that has not been written into the SLC-spare blocks. More specifically, the controller 160 retrieves the next part of the data, which follows the previously retrieved part of the data, wherein the length of the part of the data is equal to one SLC block. When the remaining part of the data is less than the memory space of one SLC block, the controller 160 retrieves all of the remaining data.

In step S316, the controller 160 writes the retrieved part of the data into one of the SLC-spare blocks SLC_SP_1~SLC_SP_N. Namely, the controller 160 writes the part of the data, which is retrieved in step S314, into one of the SLC-spare blocks SLC_SP_1~SLC_SP_N.

Next, in step S318, the controller 160 maps at least one logical address of the retrieved part of the data to the written SLC-spare block, and defines the written SLC-spare block as the SLC-data block. Namely, the controller 160 maps at least one logical address of the part of the data, which is retrieved in step S314, to the SLC-spare block written in step S316, and defines the SLC-spare block written in step S316 as an SLC-data block.

In step S332, the controller 160 determines whether all of the data is written into the SLC blocks. When all of the data is not written into the SLC blocks, the process returns to step S302 to continue to determine whether the first predetermined condition is satisfied. When all of the data is written into the SLC blocks, the process ends at step S320.

Figure 4A:
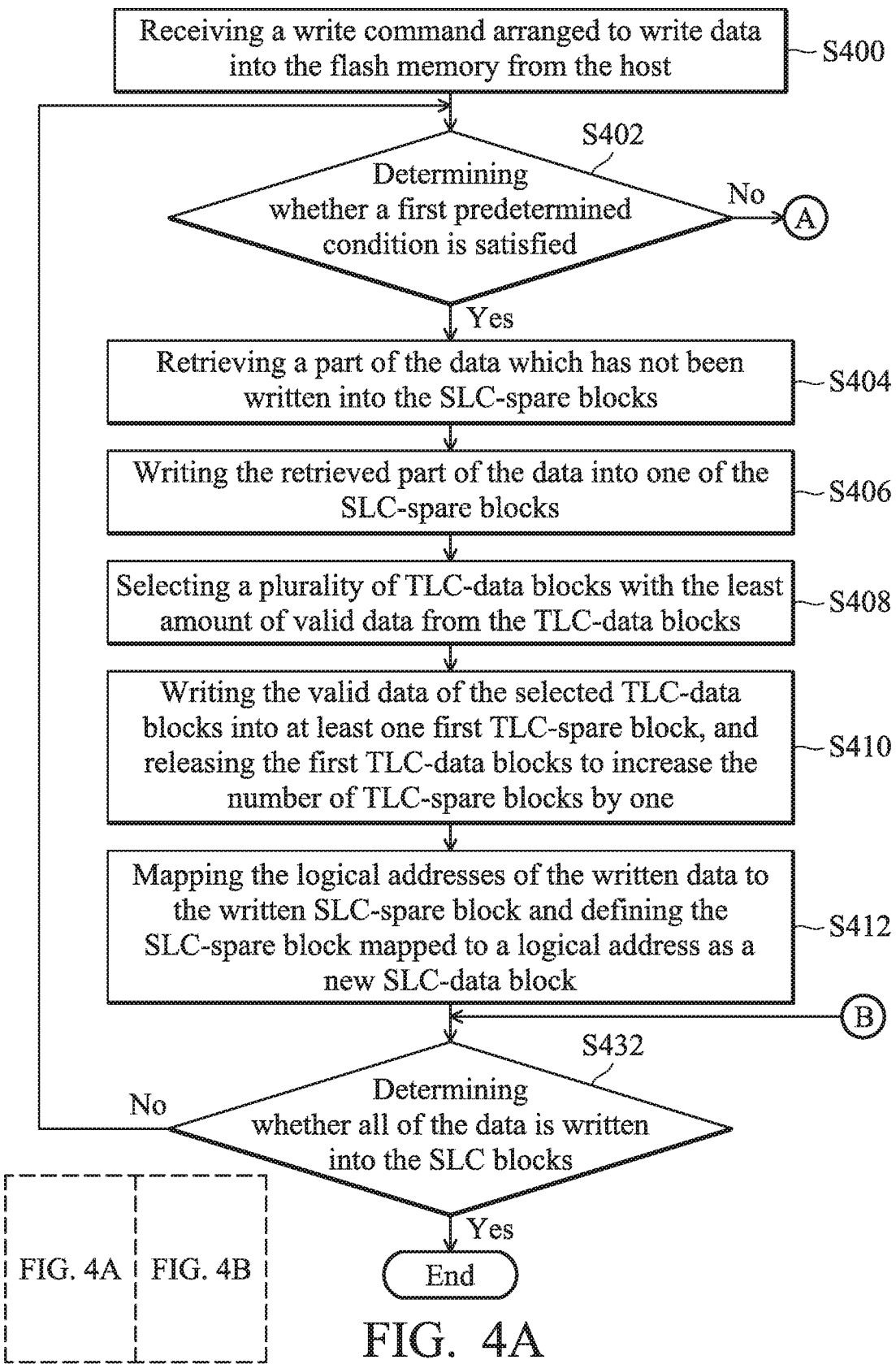
FIG. 4A-4B is a flowchart of a data maintenance method in accordance with another embodiment.
Figure 4B:
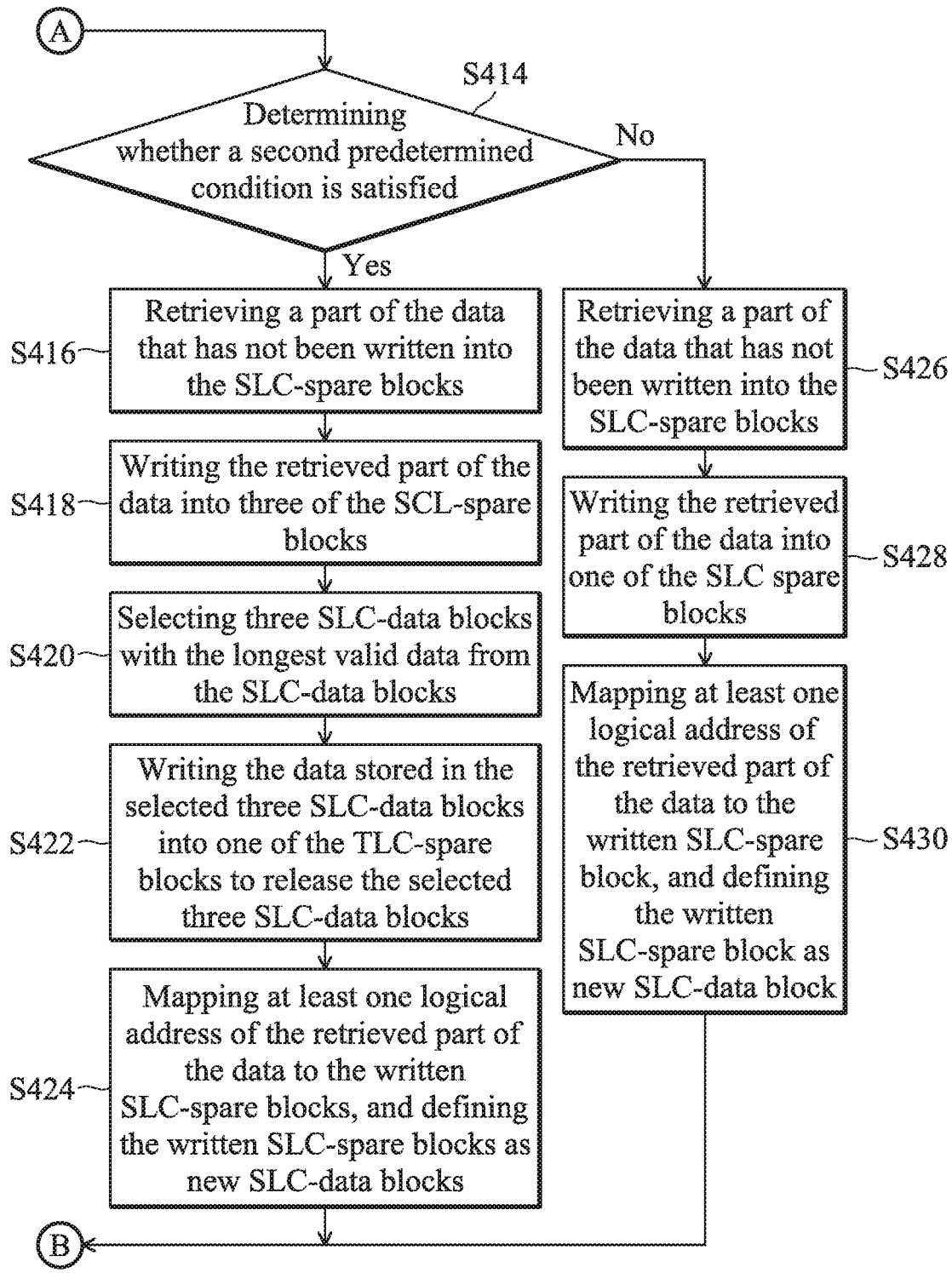

FIG. 4A-4B is a flowchart of a data maintenance method in accordance with another embodiment. The data maintenance method is applied to the data storage device 140 of FIG. 1. The process starts at step S400. The data maintenance method of FIGS. 4A-4B is similar to the data maintenance method of FIGS. 3A~3B. The data maintenance method shown in FIGS. 4A~4B can further alternatively execute the write operation and the clear operation of the SLC data blocks and the TLC blocks based on the characteristics of the SLC and TLC blocks to ensure that the SLC-spare block of the flash memory 180 will be provided stably and the write operation indicated by the host will be finished stably. Steps S300-S312 and S332 of FIGS. 3A-3B can be referred to for details of steps S400-S412 and S432.

Next, in step S414, the controller 160 determines whether a second predetermined condition is satisfied. In one embodiment, the controller 160 determines whether the number of SLC-spare blocks SLC_SP_1~SLC_SP_N is less than a second predetermined amount to determine whether the second predetermined condition is satisfied. When the number of SLC-spare blocks SLC_SP_1~SLC_SP_N is less than the second predetermined amount. More specifically, when the second predetermined condition is satisfied, the process goes to step S416 to start to clear the SLC-data blocks SLC_DA_1~SLC_DA_P. When the second predetermined condition is not satisfied, the process goes to step S426. In other embodiments, the second predetermined condition may include any event that needs to clear the SLC-data blocks.

In step S416, the controller 160 retrieves a part of the data that has not been written into the SLC-spare blocks. More specifically, the controller 160 retrieves the next part of the data, which follows the previously retrieved part of the data, wherein the length of the part of the data is equal to three SLC blocks. When the remaining part of the data is less than the memory space of three SLC blocks, the controller 160 retrieves all of the remaining data.

Next, in step S418, the controller 160 writes the retrieved part of the data into three of the SCL-spare blocks SLC_SP_1~SLC_SP_N. Namely, the controller 160 writes the part of the data, which is retrieved in step S304, into three of the SCL-spare blocks LC_SP_1~SLC_SP_N.

Next, in step S420, the controller 160 selects three SLC-data blocks with the longest valid data from the SLC-data blocks SLC_DA_1~SLC_DA_P. Namely, the controller 160 selects three SLC-data blocks with cold data from the SLC-data blocks SLC_DA_1~SLC_DA_P.

Next, in step S422, the controller 160 writes the data stored in the selected three SLC-data blocks into one of the TLC-spare blocks to release the selected three SLC-data blocks, wherein the released three SLC-data blocks lose the data link with logical address, and the released three SLC-data blocks are defined as the SLC-spare blocks.

Next, in step S424, the controller 160 maps at least one logical address of the retrieved part of the data to the written SLC-spare blocks, and defines the written SLC-spare blocks as new SLC-data blocks. Namely, the controller 160 maps the logical address of the part of the data, which is retrieved in step S304, to the SLC-spare blocks written in step S306, and defines the SLC-spare blocks written in step S306 as new SLC-data blocks.

In step S426, the controller 160 retrieves a part of the data that has not been written into the SLC-spare blocks. More specifically, the controller 160 retrieves the next part of the data, which follows the previously retrieved part of the data, wherein the length of the part of the data is equal to one SLC block. When the remaining part of the data is less than the memory space of one SLC block, the controller 160 retrieves all of the remaining data.

In step S428, the controller 160 writes the retrieved part of the data into one of the SLC spare blocks SLC_SP_1~SLC_SP_N. Namely, the controller 160 writes the part of the data, which is retrieved in step S314, into one of the SLC spare blocks SLC_SP_1~SLC_SP_N.

Next, in step S430, the controller 160 maps at least one logical address of the retrieved part of the data to the written SLC-spare block, and defines the written SLC-spare block as new SLC-data block. Namely, the controller 160 maps at least one logical address of the part of the data, which is retrieved in step S314, to the SLC-spare block written in step S316, and defines the SLC-spare block written in step S316 as new SLC-data block.

The data storage device and the data maintenance method may stably provide SLC-spare blocks and write the data into the SLC-spare blocks at the same time.

Data transmission methods, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for prac-ticing the methods. The methods may also be embodied in the form of program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A block clearing method for a non-volatile data-storage device, comprising:
    determining whether a number of spare block is less than a threshold;
    if the determination is true, selecting a plurality of data blocks programmed in a first mode;
    selecting the spare block from a spare pool;
    programming a plurality of data from the selected data blocks into the selected spare block in a second mode;
    mapping a plurality of logical addresses of the plurality of data programmed into the selected spare block to a plurality of physical addresses on the selected spare block programmed in the second mode; and
    releasing the selected data blocks into the spare pool, wherein the selected spare block is able to be programmed in either the first mode or the second mode;
    wherein if the determination is false, the method further comprises:
        retrieving a part of data that has not been written into the spare blocks;
        writing the retrieved part of data into the spare blocks in the second mode; and
        mapping at least one address of the retrieved part of data to the written spare block.

2. The block clearing method as claimed in claim 1, wherein the data are valid data.

3. The block clearing method as claimed in claim 1, wherein the data includes both valid and invalid data.

4. The block clearing method as claimed in claim 1, wherein the data are the longest data.

5. The block clearing method as claimed in claim 1, wherein the selected data blocks programmed in the first mode have the least amount of valid data.

6. The block clearing method as claimed in claim 1, wherein each of the data blocks programmed in the first mode stores fewer data than each of the data blocks programmed in the second mode.

7. The block clearing method as claimed in claim 1, wherein the second mode is a default mode.

8. The block clearing method as claimed in claim 1, wherein the method further includes:
    programming data related to a write command to another spare block selected from the spare pool in the first mode.

9. A block clearing method for a non-volatile data-storage device, comprising:

programming data related to a write command to a spare block selected from a spare pool in a first mode;

determining whether a number of spare block is less than a threshold;

if the determination is true, selecting a plurality of data blocks programmed in a second mode;

selecting the spare block from the spare pool;

programming a plurality of data from the selected data blocks into the selected spare block in the second mode;

mapping a plurality of logical addresses of the plurality of data programmed into the selected spare block to a plurality of physical addresses on the selected spare block programmed in the second mode; and releasing the selected data blocks into the spare pool, wherein the spare block is able to be programmed in either the first mode or the second mode;

wherein if the determination is false, the method further comprises:

retrieving a part of data that has not been written into the spare blocks;

writing the retrieved part of data into the spare blocks in the second mode; and mapping at least one address of the retrieved part of data to the written spare block.

10. The block clearing method as claimed in claim 9, wherein the data are valid data.

11. The block clearing method as claimed in claim 9, wherein the data includes both valid and invalid data.

12. The block clearing method as claimed in claim 9, wherein the data are the longest data.

13. The block clearing method as claimed in claim 9, wherein the selected data blocks programmed in the first mode have the least amount of valid data.

14. The block clearing method as claimed in claim 9, wherein each of the data blocks programmed in the first mode stores fewer data than each of the data blocks programmed in the second mode.

15. The block clearing method as claimed in claim 9, wherein the second mode is a default mode.

* * * * *